US012756054B2

(12) United States Patent
Von Hofen

(10) Patent No.: US 12,756,054 B2
(45) Date of Patent: Oct. 6, 2026

(54) BATTERY PACK, SYSTEM AND USE OF A BATTERY PACK

(71) Applicant: Andreas Stihl AG & Co. KG, Waiblingen (DE)

(72) Inventor: Malte Von Hofen, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 902 days.

(21) Appl. No.: 17/576,081

(22) Filed: Jan. 14, 2022

(65) Prior Publication Data

US 2022/0231374 A1 Jul. 21, 2022

(30) Foreign Application Priority Data

Jan. 15, 2021 (EP) .................................... 21151900

(51) Int. Cl.
*H01M 50/296* (2021.01)
*B25F 5/00* (2006.01)
(Continued)

(52) U.S. Cl.
CPC ....... *H01M 50/296* (2021.01); *H01M 50/247* (2021.01); *H02J 7/50* (2026.01);
(Continued)

(58) Field of Classification Search
CPC ............. H01M 50/296; H01M 50/247; H01M 2220/30; H01M 2010/4271;
(Continued)

(56) References Cited

U.S. PATENT DOCUMENTS 9,197,076 B2 11/2015 Butzman
11,027,614 B2 * 6/2021 Nakao ..................... B60L 58/21
(Continued)

FOREIGN PATENT DOCUMENTS

CN 103337889 A 10/2013
DE 10 2009 028 977 A1 3/2011
(Continued)

OTHER PUBLICATIONS

Cover Page of EP 3 113 912 A1 published Jan. 11, 2017 (one (1) page).
(Continued)

*Primary Examiner* — Julian D Huffman
*Assistant Examiner* — Aiman Bickiya
(74) *Attorney, Agent, or Firm* — Crowell & Moring LLP

(57) ABSTRACT

A battery pack has a plurality of battery cells and at least three pack power contacts. A first pack pair of the pack power contacts is designed for making contact with device power contacts of a first electrically driven work device and/or a first charging device, wherein the battery pack is designed for supplying, due to contact being made, the first work device with electrical drive power with a first electrical voltage from at least a portion of the plurality of battery cells and/or supplying, due to contact being made, at least a same portion of the plurality of battery cells with electrical charging power with the first voltage from the first charging device via the first pack pair. A second pack pair, which second pack pair is different from the first at least in portions, is designed for making contact with device power contacts of a second electrically driven work device and/or a second charging device, wherein the battery pack is designed for supplying, due to contact being made, the second work device with electrical drive power with a second electrical voltage, which is higher than the first, from
(Continued)

at least a same portion of the plurality of battery cells and/or supplying, due to contact being made, at least a same portion of the plurality of battery cells with electrical charging power with the second voltage from the second charging device via the second pack pair.

9 Claims, 2 Drawing Sheets

(51) Int. Cl.

| | |
|---|---|
| ***H01M 50/247*** | (2021.01) |
| ***H02J 7/50*** | (2026.01) |
| ***H02J 7/70*** | (2026.01) |
| ***H02J 7/90*** | (2026.01) |

(52) U.S. Cl.

CPC ................. *H02J 7/70* (2026.01); *H02J 7/90* (2026.01); *B25F 5/00* (2013.01); *H01M 2220/30* (2013.01); *H02J 2207/20* (2020.01)

(58) Field of Classification Search

CPC ............. H01M 10/4207; H01M 50/543; H02J 7/0013; H02J 7/0042; H02J 7/007; H02J 2207/20; H02J 7/0014; H02J 7/0045; B25F 5/00; Y02E 60/10

USPC .......................................................... 320/112

See application file for complete search history.

(56) References Cited

U.S. PATENT DOCUMENTS

| | | | | |
|---|---|---|---|---|
| 11,211,664 | B2 * | 12/2021 | Barton | H01M 50/213 |
| 2012/0194133 | A1 | 8/2012 | Posamentier et al. | |
| 2012/0217797 | A1 * | 8/2012 | Butzmann | B60L 58/10 307/77 |
| 2013/0002175 | A1 | 1/2013 | Shimizu et al. | |
| 2014/0009857 | A1 | 1/2014 | Suzuki | |
| 2015/0002083 | A1 * | 1/2015 | Nakao | H01M 10/44 320/107 |
| 2017/0072553 | A1 * | 3/2017 | Bakker | B25F 5/008 |

FOREIGN PATENT DOCUMENTS

| | | | |
|---|---|---|---|
| DE | 10 2009 046 501 | A1 | 5/2011 |
| DE | 10 2013 107 767 | A1 | 1/2015 |
| EP | 2 602 064 | A1 | 6/2013 |
| EP | 3 376 558 | A1 | 9/2018 |
| WO | WO 2015/132606 | A1 | 9/2015 |

OTHER PUBLICATIONS

German-language European Search Report issued in European Application No. 21151900.4 dated Jul. 12, 2021 with partial English translation (seven (7) pages).

* cited by examiner

BATTERY PACK, SYSTEM AND USE OF A BATTERY PACK

CROSS REFERENCE TO RELATED APPLICATION

This application claims priority under 35 U.S.C. § 119 from European Patent Application No. 21151900.4, filed Jan. 15, 2021, the entire disclosure of which is herein expressly incorporated by reference.

BACKGROUND AND SUMMARY OF THE INVENTION

The invention relates to a battery pack, a system having such a battery pack and use of such a battery pack.

The invention is based on the object of providing a battery pack which has improved properties, a system having such a battery pack and use of such a battery pack.

The invention solves the problem by providing a battery pack, a system having such a battery pack, and use of such a battery pack, in accordance with the independent claims. Advantageous developments and/or refinements of the invention are described in the dependent claims.

The battery pack according to the invention comprises or has a plurality of battery cells and at least, in particular precisely, three, in particular electrical, pack power contacts or pack power clamps or pack power connections or pack power terminals. A first pack pair of the pack power contacts is designed or configured for making, in particular mechanical and/or direct, contact with device power contacts, in particular in each case, a first electrically driven work device and/or a first, in particular electrical, charging device. The battery pack is designed or configured for, in particular automatically and/or directly, supplying, in particular only or solely and/or automatically, due to contact being made, the first work device with electrical drive power with a first electrical voltage, in particular of a first value of the first voltage and/or rated voltage, from at least a portion of the plurality of battery cells and/or supplying, due to contact being made, at least a, in particular the, same portion of the plurality of battery cells with electrical charging power with the first voltage from the first charging device by means of the first pack pair. A second pack pair of the pack power contacts, which second pack pair is different from the first at least, in particular only, in portions, is designed or configured for making, in particular mechanical and/or direct, contact with device power contacts, in particular in each case, of a second electrically driven work device and/or a second, in particular electrical, charging device. The battery pack is designed or configured for, in particular automatically and/or directly, supplying, in particular only or solely and/or automatically, due to contact being made, the second work device with electrical drive power with a second electrical voltage, which is higher than the first, in particular of a second value of the second voltage and/or rated voltage that is higher than the first, from at least a, in particular the, same portion of the plurality of battery cells and/or supplying, due to contact being made, at least a, in particular the, same portion of the plurality of battery cells with electrical charging power with the second voltage from the second charging device by means of the second pack pair.

This, in particular defining or specifying the supply with the first voltage, in particular only or solely and/automatically, due to contact being made by the first pack pair and with the second voltage, in particular only or solely and/or automatically, due to contact being made by the second pack pair, renders possible simple and safe design or simple and safe construction of the battery pack. In particular, the battery pack need not or cannot be designed in any other way, e.g. not having a communication device for communicating with the first work device, the first charging device, the second work device and/or the second charging device and/or not having a user specification device for, in particular manual, user specification, for defining the supply with, in particular either, the first voltage or the second voltage. In addition or as an alternative, this renders possible simple and safe use of the battery pack with the first work device and/or the first charging device, in particular with the first voltage, and/or with the second work device and/or the second charging device, in particular with the second voltage, in particular wherein the first work device, the first charging device, the second work device and/or the second charging device may already be present.

In particular, the battery pack can be called a "Dual System Battery".

The, in particular first or second, work device may be a gardening, forestry, construction and/or floor-treatment device. In addition or as an alternative, the, in particular first or second, work device may be floor- and/or hand-guided, in particular hand-held. In particular hand-guided, in particular hand-held, work device may mean that the, in particular first or second, work device may have or exhibit a mass of at most 50 kg (kilograms), in particular at most 20 kg, in particular at most 10 kg.

The battery pack can be designed for, in particular electrical and/or mechanical, connection to the first work device, the first charging device, the second work device and/or the second charging device in a releasable manner, in particular without the use of tools and/or non-destructively. In particular, the battery pack can be designed for being carried by the first work device, the first charging device, the second work device and/or the second charging device.

The, in particular respective, contacting can be electrical and mechanical contact-connection.

In particular at one moment in time, in particular either, the first pack pair can make contact with the, in particular respective, device power contacts, in particular either, of the first work device or the first charging device or the second pack pair can make contact with the, in particular respective, device power contacts, in particular either, of the second work device or the second charging device. In addition or as an alternative, the first pack pair need not or cannot be designed for making contact with the device power contacts of the second work device and/or the second charging device, and/or the second pack pair need not or cannot be designed for making contact with the device power contacts of the first work device and/or the first charging device.

The pack power contacts can be plug-in connectors.

The battery cells may each be individual rechargeable storage elements for electrical energy on an electrochemical basis. In addition or as an alternative, the battery cells may be lithium-ion battery cells. Further in addition or as an alternative, the battery cells may be identical, in particular of identical type and/or design. Further in addition or as an alternative, a, in particular respective, cell voltage, in particular cell rated voltage, of one of, in particular a respective one of, the battery cells may be at least 2 V (volts) and/or at most 4 V, in particular 3.6 V. Further in addition or as an alternative, the battery cells may be round cells, prismatic cells or pouch cells.

In a development of the invention, the battery pack is designed for being supplied with only or solely the first voltage by means of the first pack pair. The battery pack is designed for being supplied with only or solely the second voltage by means of the second pack pair. In particular, the battery pack need not or cannot be designed for being supplied with a, in particular the second, voltage that is different from the first by means of the first pack pair. In addition or as an alternative, the battery pack need not or cannot be designed for being supplied with a, in particular the first, voltage that is different from the second by means of the second pack pair.

In a development of the invention, the plurality of battery cells comprises or has a first number of battery cells and a second number of battery cells. The battery pack is designed for being supplied with the first voltage defined or specified by a first total voltage, in particular a first value of the first total voltage, in particular equal to the first total voltage, only or solely of the first number of battery cells. The battery pack is designed for being supplied with the second voltage defined by a second total voltage, in particular a second value of the second total voltage, in particular equal to the second total voltage, of the first number of battery cells and the second number of battery cells, interconnected or connected, in particular to one another or commonly or together and/or permanently or in the long term and/or directly, electrically in series. This renders it possible for the second voltage to be higher than the first voltage.

In a development of the invention, the plurality of battery cells comprises or has a, in particular the, first number of battery cells and a, in particular the, second number of battery cells. The first number of battery cells and the first pack pair are interconnected or connected, in particular to one another and/or permanently or in the long term and/or directly, electrically in parallel. The first number of battery cells and the second number of battery cells are interconnected or connected, in particular to one another or commonly or together and/or permanently or in the long term and/or directly, electrically in series and the second pack pair are interconnected or connected, in particular to one another and/or permanently or in the long term and/or directly, electrically in parallel. This renders it possible for the battery pack to be designed for being supplied, due to contact being made by the first pack pair, with the first voltage, and for the battery pack to be designed for being supplied, due to contact being made by the second pack pair, with the second voltage. In other words: this renders possible definition of the supply with the first voltage due to contact being made by the first pack pair and with the second voltage due to contact being made by the second pack pair. In particular, one pack power contact of the first pack pair can be, in particular directly, electrically connected to an end-side cell contact of the first number of battery cells or can be at a, in particular same, potential, and another pack power contact of the first pack pair can be, in particular directly, electrically connected to another end-side cell contact of the first number of battery cells or can be at a, in particular same, potential. In addition or as an alternative, one pack power contact of the second pack pair can be, in particular directly, electrically connected to an end-side cell contact of the first number of battery cells and the second number of battery cells or can be at a, in particular same, potential, and another pack power contact of the second pack pair can be, in particular directly, electrically connected to another end-side cell contact of the first number of battery cells and the second number of battery cells or can be at a, in particular same, potential.

In a development of the invention, the plurality of battery cells comprises or has a, in particular the, first number of battery cells and/or a, in particular the, second number of battery cells. The battery pack comprises or has, in particular only, one, in particular single and/or electrical, power transmission device. The power transmission device is designed or configured for, in particular automatically and/or directly, transmitting electrical charging and/or drive power from the first pack pair and/or the first number of battery cells to the second number of battery cells and/or from the second number of battery cells to the first pack pair and/or the first number of battery cells, in particular for adjusting a first state of charge, in particular a first value of the first state of charge, of the first number of battery cells and/or a second state of charge, in particular a second value of the second state of charge, of the second number of battery cells, in particular for matching the first state of charge and the second state of charge to one another. This renders it possible, when the first charging device is supplied with the charging power, for not only the first number of battery cells but also the second number of battery cells to be supplied with said charging power. In addition or as an alternative, this renders it possible, when the first work device is supplied with the drive power, for this to be done not only by the first number of battery cells but also by the second number of battery cells. Further in addition or as an alternative, in particular therefore, this renders possible "cell balancing" of the battery cells.

In a refinement of the invention, the power transmission device comprises or has, in particular only, one, in particular single, DC-to-DC converter or DC/DC converter or DC chopper, in particular is the DC-to-DC converter. In particular, the DC-to-DC converter can be bidirectional.

In a refinement of the invention, the power transmission device comprises or has at least, in particular precisely, three, in particular electrical, inputs and/or outputs. A first transmission pair of the inputs and/or outputs and the first number of battery cells and/or the first pack pair are interconnected or connected, in particular to one another and/or permanently or in the long term and/or directly, electrically in parallel. In addition or as an alternative, a second transmission pair of the inputs and/or outputs, which second transmission pair is different from the first at least, in particular only, in portions, and the second number of battery cells are interconnected or connected, in particular to one another and/or permanently or in the long term and/or directly, electrically in parallel. Further in addition or as an alternative, a third transmission pair of the inputs and/or outputs, which third transmission pair is different from the first and/or the second at least, in particular in each case only, in portions, and the first number of battery cells and the second number of battery cells are interconnected or connected, in particular to one another or commonly or together and/or permanently or in the long term and/or directly, electrically in series and/or the second pack pair are interconnected or connected, in particular to one another and/or permanently or in the long term and/or directly, electrically in parallel. This renders it possible to transmit the charging and/or drive power. In particular, an input and/or output of the first transmission pair can be, in particular directly, electrically connected to an end-side cell contact of the first number of battery cells and/or a pack power contact of the first pack pair or can be at a, in particular same, potential, and another input and/or output of the first transmission pair can be, in particular directly, electrically connected to another end-side cell contact of the first number of battery cells and/or another pack power contact of the first pack pair or can be at a, in particular same, potential. In addition or as an alternative, an input and/or output of the second transmission pair can be, in particular directly, electrically connected to an end-side cell contact of the second number of battery cells or can be at a, in particular same, potential, and another input and/or output of the second transmission pair can be, in particular directly, electrically connected to another end-side cell contact of the second number of battery cells or can be at a, in particular same, potential. Further in addition or as an alternative, an input and/or output of the third transmission pair can be, in particular directly, electrically connected to an end-side cell contact of the first number of battery cells and the second number of battery cells and/or a pack power contact of the second pack pair, or can be at a, in particular same, potential, and another input and/or output of the third transmission pair can be, in particular directly, electrically connected to another end-side cell contact of the first number of battery cells and the second number of battery cells and/or another pack power contact of the second pack pair or can be at a, in particular same, potential.

In a refinement of the invention, the power transmission device is, in particular electrically, adjustable, in particular open-loop control and/or closed-loop control can be performed on it. The battery pack comprises or has an, in particular electrical, adjustment device, in particular an open-loop control and/or closed-loop control device. The adjustment device is designed or configured for, in particular automatically and/or electrically, adjusting, in particular performing open-loop control and/or closed-loop control on, the power transmission device in such a way that the first state of charge and/or the second state of charge are/is adjusted, in particular are matched. In particular, the adjustment device can be designed for adjustment based on operating data or use data, in particular relating to temporally preceding operation or temporally preceding use, of the battery pack. In addition or as an alternative, the adjustment device can be designed for, in particular wirelessly, receiving adjustment information, in particular based on, in particular, the operating data or the use data, in particular relating to the temporally preceding operation or the temporally preceding use, of the battery pack from an external, in particular mobile, device, in particular a smartphone, for adjustment purposes. In particular, the combination of features, in particular in this paragraph, may be or constitute an independent or stand-alone invention, in particular that the battery pack is designed for being supplied, due to contact being made by the first pack pair, with the first voltage, and that the battery pack is designed for being supplied, due to contact being made by the second pack pair, with the second voltage.

In a development of the invention, the first voltage is an, in particular first, rated voltage of at least 10 V, in particular at least 30 V, and/or at most 43 V. In addition or as an alternative, the second voltage is an, in particular second, rated voltage of at least 18 V, in particular at least 43 V, and/or at most 72 V, in particular at most 54 V.

In addition or as an alternative, the second voltage can be at least 10% (per cent), in particular at least 20%, in particular at least 30%, higher than the first voltage.

Further in addition or as an alternative, the battery pack, in particular the plurality of battery cells, can have or exhibit a maximum electrical drive and/or charging power of at least 10 watts (W), in particular at least 100 W, in particular at least 1 kilowatt (kW), in particular at least 2 kW, and/or at most 10 kW, in particular at most 5 kW, in particular 3 kW.

Further in addition or as an alternative, the battery pack, in particular the plurality of battery cells, can have or exhibit an, in particular electrical, maximum energy content of at least 100 watt hours (Wh), in particular at least 200 Wh, and/or at most 4000 Wh, in particular at most 2000 Wh, in particular at most 1000 Wh, in particular at most 500 Wh, in particular 337 Wh.

In a development, in particular a refinement, of the invention, the battery pack comprises or has, in particular only, one, in particular single and/or common, pack housing, in particular battery pack housing. The plurality of battery cells, in particular and the power transmission device if present, and/or the adjustment device if present, is, in particular are, arranged in the pack housing. In particular, the pack power contacts are arranged on the pack housing, in particular an edge of the pack housing. This renders it possible for the plurality of battery cells to be held together and/or for protection, in particular of the plurality of battery cells, against external influences to be provided. In particular, the pack housing can be solid.

The system according to the invention comprises or has a, in particular the, battery pack as mentioned above and the first work device and/or the first charging device and/or the second work device and/or the second charging device. In particular, the, in particular first or second, work device or the, in particular first or second, charging device can have a battery receptacle, in particular a battery slot, wherein the battery receptacle can be designed for receiving the battery pack.

In a development of the invention, the first work device and/or the second work device are/is a saw, in particular a chain saw, a pole pruner, a brush cutter, a set of hedge shears, a hedge cutter, a blower device, a leaf blower, a lopper, a separation grinder, a sweeping device, a sweeping roller, a sweeping brush, a lawnmower, a scarifier, a set of grass shears or a high-pressure cleaner.

The use according to the invention is use of a, in particular the, battery pack as mentioned above, in particular of a, in particular the, system as mentioned above, with the first work device and/or the first charging device with the first voltage and/or with the second work device and/or the second charging device with the second voltage.

Further advantages and aspects of the invention become apparent from the claims and from the description of exemplary embodiments of the invention, which are explained below with reference to the figures.

DETAILED DESCRIPTION OF THE DRAWINGS

Figure 1:
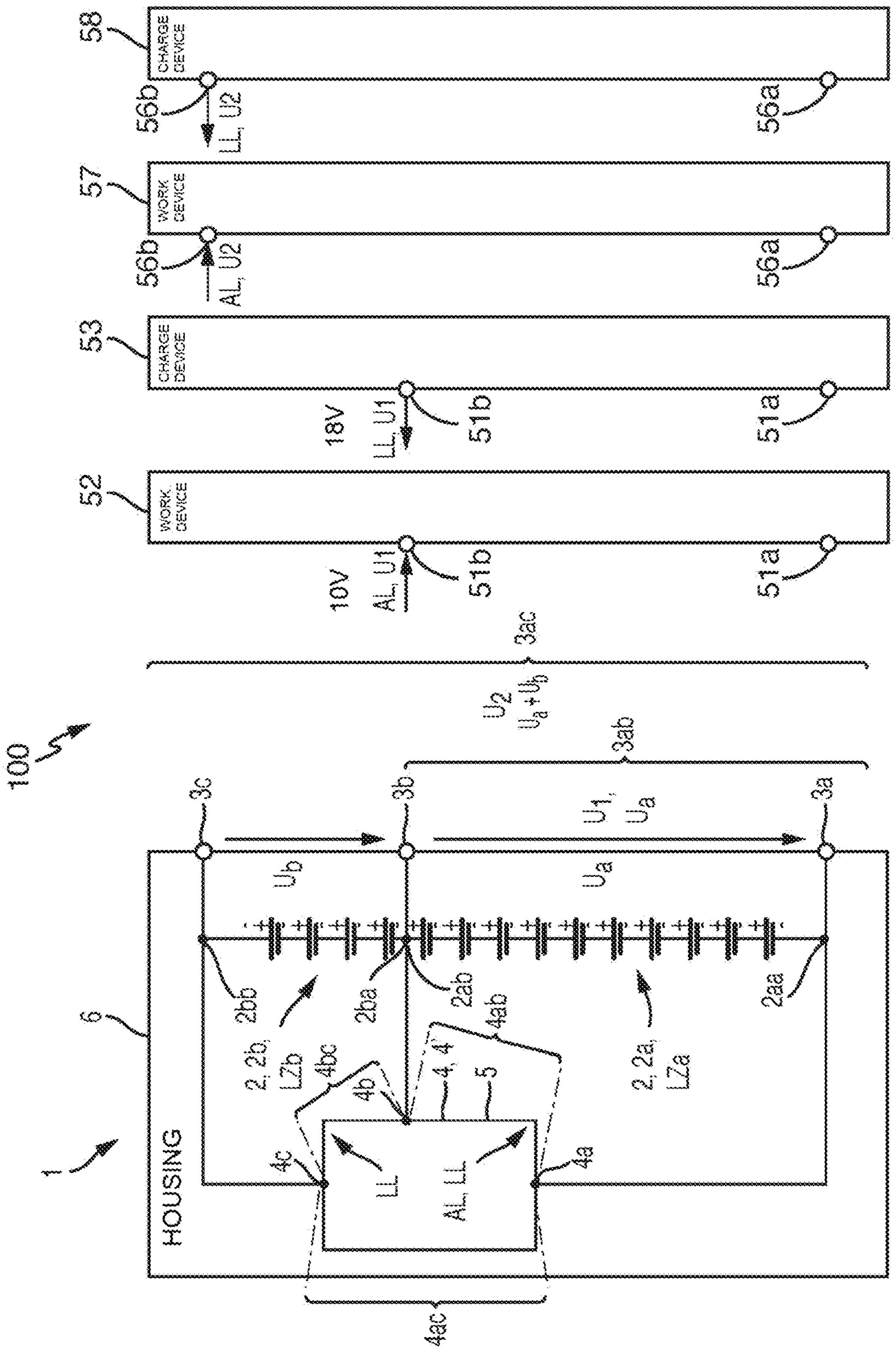
FIG. 1 is a schematic view, in particular a circuit diagram, of a system according to an embodiment of the invention having a battery pack according to an embodiment of the invention, a first work device, a first charging device, a second work device and a second charging device.
Figure 2:
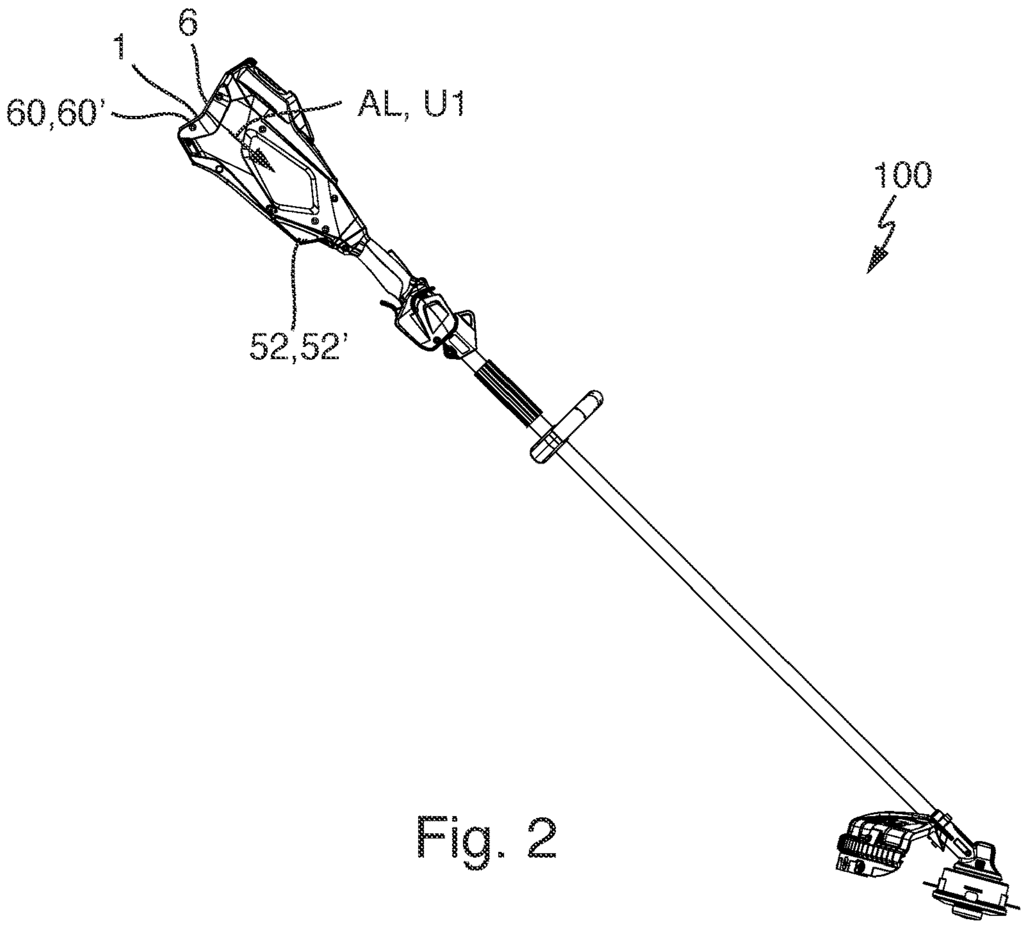
FIG. 2 shows use of the battery pack with the first work device of FIG. 1 with a first voltage.
Figure 3:
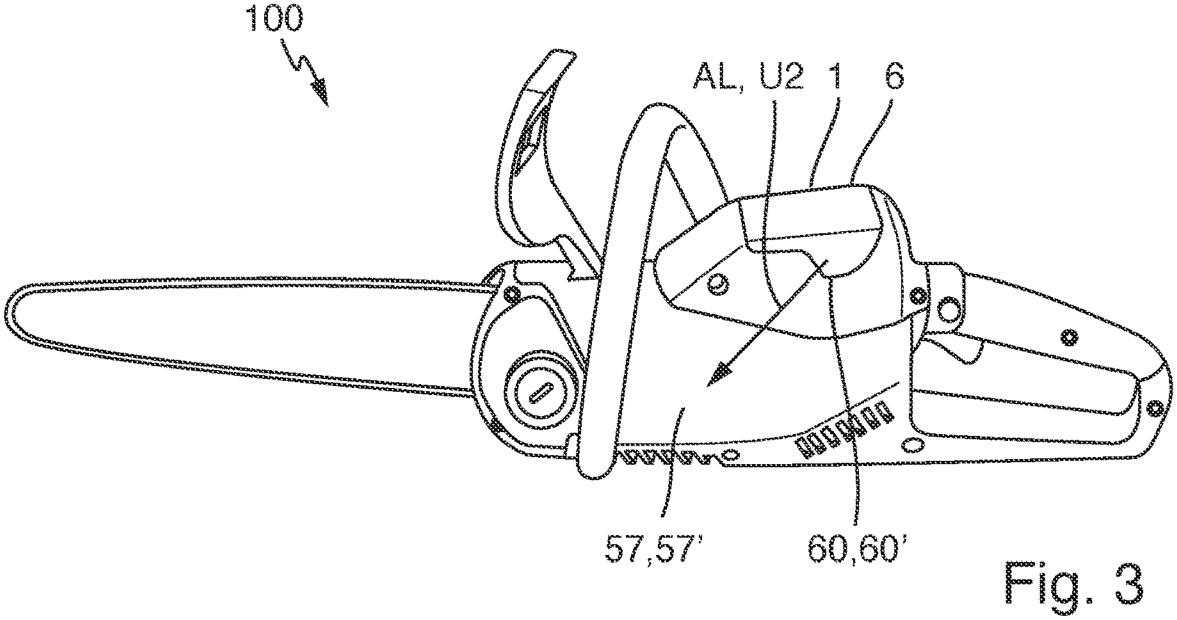
FIG. 3 shows use of the battery pack with the second work device of FIG. 1 with a second voltage.

FIGS. 1 to 3 show a system 100 having a battery pack 1 and a first electrically driven work device 52 and/or a first charging device 53 and/or a second electrically driven work device 57 and/or a second charging device 58.

The battery pack 1 has a plurality of battery cells 2 and at least three pack power contacts **3*a*, 3*b*, 3*c*. A first pack pair 3*ab* of the pack power contacts 3*a*, 3*b* is designed for making contact, in particular makes contact, with device power contacts 51*a*, 51*b* of the first electrically driven work device 52 and/or the first charging device 53. The battery pack 1 is designed for supplying, in particular supplies, due to contact being made, the first work device 52 with electrical drive power AL with a first electrical voltage U1 from at least a portion of the plurality of battery cells 2 and/or at least a, in the exemplary embodiment shown the, same portion of the plurality of battery cells 2 with electrical charging power LL with the first voltage U1 from the first charging device 53 by means of the first pack pair 3***ab*. A second pack pair 3*ac* of the pack power contacts 3*a*, 3*c*, which second pack pair is different from the first at least, in the exemplary embodiment shown only, in portions, is designed for making contact, in particular makes contact, with device power contacts 56*a*, 56*b* of the second electrically driven work device 57 and/or the second charging device 58. The battery pack 1 is designed for supplying, in particular supplies, due to contact being made, the second work device 57 with electrical drive power AL with a second electrical voltage U2, which is higher than the first, from at least a, in the exemplary embodiment shown the, same portion of the plurality of battery cells 2 and/or at least a, in particular the, same portion of the plurality of battery cells 2 with electrical charging power LL with the second voltage U2 from the second charging device 58 by means of the second pack pair 3*ac*.

In the exemplary embodiment shown, the battery pack 1 has precisely three pack power contacts 3*a*, 3*b*, 3*c*. In alternative exemplary embodiments, the battery pack can have at least four pack power contacts. In addition or as an alternative, in alternative exemplary embodiments, a third pack pair of the pack power contacts, which third pack pair is different from the first and/or the second at least, in particular in each case only, in portions, can be designed for making contact, in particular makes contact, with device power contacts, in particular respectively, of a third electrically driven work device and/or a third, in particular electrical, charging device. The battery pack can be designed for supplying, in particular supplies, in particular only and/or automatically, due to contact being made, the third work device with electrical drive power with, in particular only, a third electrical voltage, in particular which is different from the first and/or the second, in particular a third value of the third voltage and/or rated voltage, from at least a, in particular the, same portion of the plurality of battery cells and/or at least a, in particular the, same portion of the plurality of battery cells with electrical charging power with, in particular only, the third voltage from the third charging device by means of the third pack pair.

FIG. 2 shows the use of the battery pack 1 with the first work device 52 with the first voltage U1.

FIG. 3 shows the use of the battery pack 1 with the second work device 57 with the second voltage U2.

In the exemplary embodiment shown, the first work device 52 is a brush cutter 52' and the second work device 57 is a saw 57'. In alternative exemplary embodiments, the first work device and/or the second work device may be a saw, a pole pruner, a brush cutter, a set of hedge shears, a hedge cutter, a blower device, a leaf blower, a lopper, a separation grinder, a sweeping device, a sweeping roller, a sweeping brush, a lawnmower, a scarifier, a set of grass shears or a high-pressure cleaner.

In particular at one moment in time, the first pack pair 3*ab* makes contact with the device power contacts 51*a*, 51*b* of the first work device 52. The battery pack 1 supplies, due to contact being made, the first work device 52 with drive power AL with the first voltage U1 from at least the portion of the plurality of battery cells 2 by means of the first pack pair 3*ab*.

As an alternative or at another moment in time, the first pack pair 3*ab* makes contact with the device power contacts 51*a*, 51*b* of the first charging device 53. The battery pack 1 supplies, due to contact being made, at least the portion of the plurality of battery cells 2 with charging power LL with the first voltage U1 from the first charging device 53 by means of the first pack pair 3*ab*.

Further as an alternative or at another further moment in time, the second pack pair 3*ac* makes contact with the device power contacts 56*a*, 56*b* of the second work device 57. The battery pack 1 supplies, due to contact being made, the second work device 57 with drive power AL with the second voltage U2 from at least the portion of the plurality of battery cells 2 by means of the second pack pair 3*ac*.

Once again further as an alternative or at another yet further moment in time, the second pack pair 3*ac* makes contact with the device power contacts 56*a*, 56*b* of the second charging device 58. The battery pack 1 supplies, due to contact being made, at least the portion of the plurality of battery cells 2 with charging power LL with the second voltage U2 from the second charging device 58 by means of the second pack pair 3*ac*.

Specifically, the battery pack 1 is designed for being supplied, in particular is supplied, with only the first voltage U1 by means of the first pack pair 3*ab*. The battery pack 1 is designed for being supplied, in particular is supplied, with only the second voltage U2 by means of the second pack pair 3*ac*.

Furthermore, the plurality of battery cells 2 has a first number of battery cells 2*a* and/or a second number of battery cells 2*b*.

In the exemplary embodiment shown, the first number of battery cells 2*a* has ten battery cells. In alternative exemplary embodiments, the first number of battery cells can have only one single battery cell or at least two battery cells.

Furthermore, in the exemplary embodiment shown, the second number of battery cells 2*b* has four battery cells. In alternative exemplary embodiments, the second number of battery cells can have only one single battery cell or at least two battery cells.

In addition, the battery pack 1 is designed for being supplied, in particular is supplied, with the first voltage U1 defined by a first total voltage Ua, in the exemplary embodiment shown equal to the first total voltage Ua, only of the first number of battery cells 2*a*. The battery pack 1 is designed for being supplied, in particular is supplied, with the second voltage U2 defined by a second total voltage Ua+Ub, in the exemplary embodiment shown equal to the second total voltage Ua+Ub, of the first number of battery cells 2*a* and the second number of battery cells 2*b*, interconnected, in the exemplary embodiment shown permanently, electrically in series.

In alternative exemplary embodiments, the battery pack can be designed for being supplied, in particular is supplied, with the third voltage defined by a third total voltage, in particular equal to the third total voltage, only of the second number of battery cells.

Further in addition, the first number of battery cells 2*a* and the first pack pair 3*ab* are interconnected, in the exemplary embodiment shown permanently, electrically in parallel. The first number of battery cells 2*a* and the second number of battery cells 2*b* are interconnected, in the exemplary embodiment shown permanently, electrically in series and the second pack pair 3*ac* are interconnected, in the exemplary embodiment shown permanently, electrically in parallel.

In the exemplary embodiment shown, the battery pack 1 has a first pack power contact 3*a*, a second pack power contact 3*b* and a third pack power contact 3*c*. The first number of battery cells 2*a* has a first cell contact 2*aa* and a second cell contact 2*ab*. The second number of battery cells 2*b* has a first cell contact 2*ba* and a second cell contact 2*bb*. The first pack power contact 3*a* is, in particular directly, electrically connected to the first cell contact 2*aa* of the first number of battery cells 2*a* or is at a, in particular same, potential. The second pack power contact 3*b* is, in particular directly, electrically connected to the second cell contact 2*ab* of the first number of battery cells 2*a* and the first cell contact 2*ba* of the second number of battery cells 2*b* or is at a, in particular same, potential. The third pack power contact 3*c* is, in particular directly, electrically connected to the second cell contact 2*bb* of the second number of battery cells 2*b* or is at a, in particular same, potential.

Once again further in addition, the battery pack 1 has a power transmission device 4. The power transmission device 4 is designed for transmitting, in particular transmits, electrical charging and/or drive power LL, AL from the first pack pair 3*ab* and/or the first number of battery cells 2*a* to the second number of battery cells 2*b* and/or from the second number of battery cells 2*b* to the first pack pair 3*ab* and/or the first number of battery cells 2*a*, in particular for adjusting a first state of charge LZa of the first number of battery cells 2*a* and/or a second state of charge LZb of the second number of battery cells 2*b*.

Specifically, the power transmission device 4 has a DC-to-DC converter 4', in particular is the DC-to-DC converter 4'.

Moreover, the power transmission device 4 has at least three inputs and/or outputs 4*a*, 4*b*, 4*c*. A first transmission pair 4*ab* of the inputs and/or outputs 4*a*, 4*b* and the first number of battery cells 2*a* and/or the first pack pair 3*ab* are interconnected, in the exemplary embodiment shown permanently, electrically in parallel. In addition or as an alternative, a second transmission pair 4*bc* of the inputs and/or outputs 4*b*, 4*c*, which second transmission pair is different from the first at least, in the exemplary embodiment shown only, in portions, and the second number of battery cells 2*b* are interconnected, in the exemplary embodiment shown permanently, electrically in parallel. Further in addition or as an alternative, a third transmission pair 4*ac* of the inputs and/or outputs 4*a*, 4*c*, which third transmission pair is different from the first and/or the second at least, in the exemplary embodiment shown in each case only, in portions, and the first number of battery cells 2*a* and the second number of battery cells 2*b* are interconnected, in the exemplary embodiment shown permanently, electrically in series and/or the second pack pair 3*ac* are interconnected, in the exemplary embodiment shown permanently, electrically in parallel.

In the exemplary embodiment shown, the power transmission device 4 has precisely three inputs and/or outputs 4*a*, 4*b*, 4*c*. In alternative exemplary embodiments, the power transmission device can have at least four inputs and/or outputs.

Furthermore, in the exemplary embodiment shown, the power transmission device 4 has a first input and/or output 4*a*, a second input and/or output 4*b* and a third input and/or output 4*c*. The first input and/or output 4*a* is, in particular directly, electrically connected to the first cell contact 2*aa* of the first number of battery cells 2*a* and/or the first pack power contact 3*a* or is at a, in particular same, potential. The second input and/or output 4*b* is, in particular directly, electrically connected to the second cell contact 2*ab* of the first number of battery cells 2*a* and the first cell contact 2*ba* of the second number of battery cells 2*b* and/or the second pack power contact 3*b* or is at a, in particular same, potential. The third input and/or output 4*c* is, in particular directly, electrically connected to the second cell contact 2*bb* of the second number of battery cells 2*b* and/or the third pack power contact 3*c* or is at a, in particular same, potential.

Furthermore, the power transmission device 4 is adjustable. The battery pack 4 has an adjustment device 5. The adjustment device 5 is designed to adjust, in particular adjusts, the power transmission device 4 in such a way that the first state of charge LZa and/or the second state of charge LZb are/is adjusted.

Further, the first voltage U1 is a rated voltage of at least 10 V, in particular at least 30 V, and/or at most 43 V, in the exemplary embodiment shown 36 V. In addition or as an alternative, the second voltage U2 is a rated voltage of at least 18 V, in particular at least 43 V, and/or at most 72 V, in particular at most 54 V, in the exemplary embodiment shown 50.4 V.

Moreover, the battery pack 1 has a pack housing 6. The plurality of battery cells 2, in particular and the power transmission device 4 and/or the adjustment device 5, are arranged in the pack housing 6. In the exemplary embodiment shown, the pack power contacts 3*a*, 3*b*, 3*c* are arranged on the pack housing 6.

In addition, the, in particular first or second, work device 52, 57 or the, in particular first or second, charging device 53, 58 has a battery receptacle 60, in particular a battery slot 60'. The battery receptacle 60 is designed for receiving the battery pack 1, in particular the battery pack 1 is received.

As the exemplary embodiments shown and explained above demonstrate, the invention provides an advantageous battery pack, wherein the battery pack has improved properties, an advantageous system having such a battery pack and an advantageous use of such a battery pack.

What is claimed is:

1. A battery pack, comprising:

a plurality of battery cells; and at least three pack power contacts, wherein a first pack pair of the pack power contacts is designed for making contact with device power contacts of a first electrically driven work device and/or a first charging device, wherein the battery pack is designed for supplying, due to contact being made, the first work device with electrical drive power with a first electrical voltage from at least a portion of the plurality of battery cells and/or supplying, due to contact being made, at least a same portion of the plurality of battery cells with electrical charging power with the first voltage from the first charging device by way of the first pack pair, and wherein a second pack pair of the pack power contacts, which second pack pair is different from the first pack pair at least in portions, is designed for making contact with device power contacts of a second electrically driven work device and/or a second charging device, wherein the battery pack is designed for supplying, due to contact being made, the second work device with electrical drive power with a second electrical voltage, which is higher than the first voltage, from at least a same portion of the plurality of battery cells and/or supplying, due to contact being made, at least a same portion of the plurality of battery cells with electrical charging power with the second voltage from the second charging device by way of the second pack pair, a power transmission device, wherein the plurality of battery cells has a first number of battery cells and a second number of battery cells, wherein the power transmission device is designed for transmitting electrical charging and/or drive power from the first pack pair and/or the first number of battery cells to the second number of battery cells and/or from the second number of battery cells to the first pack pair and/or the first number of battery cells for adjusting a first state of charge of the first number of battery cells and a second state of charge of the second number of battery cells, wherein the power transmission device has at least three inputs and/or outputs, wherein a first transmission pair of the inputs and/or outputs and the first number of battery cells and the first pack pair are permanently interconnected electrically in parallel and not the second number of battery cells, wherein a second transmission pair of the inputs and/or outputs, which second transmission pair is different from the first transmission pair at least in portions, and the second number of battery cells are permanently interconnected electrically in parallel and not the first number of battery cells, and wherein a third transmission pair of the inputs and/or outputs, which third transmission pair is different from the first transmission pair and the second transmission pair at least in portions, and the first number of battery cells and the second number of battery cells permanently interconnected electrically in series and the second pack pair are permanently interconnected electrically in parallel, wherein the battery pack is designed for supplying the first voltage defined by a first total voltage only of the first number of battery cells, wherein the battery pack is designed for supplying the second voltage defined by a second total voltage of the first number of battery cells and the second number of battery cells permanently interconnected electrically in series, wherein at least one pack power contact of the first pack pair is configured to not make contact with the device power contacts of the second work device and/or the second charging device, wherein the battery pack is designed for supplying only the first voltage by way of the first pack pair, and wherein the battery pack is designed for supplying only the second voltage by way of only the second pack pair.

2. The battery pack according to claim 1, wherein the power transmission device comprises a DC-to-DC converter.

3. The battery pack according to claim 1, wherein the power transmission device is adjustable, and wherein the battery pack has an adjustment device, wherein the adjustment device is designed to adjust the power transmission device in such a way that the first state of charge or the second state of charge is adjusted.

4. The battery pack according to claim 3, further comprising:

a pack housing, wherein the plurality of battery cells and the power transmission device or the adjustment device are arranged in the pack housing, and wherein the pack power contacts are arranged on the pack housing.

5. The battery pack according to claim 1, wherein the first voltage is a rated voltage of at least 10 V and/or at most 43 V, or wherein the second voltage is a rated voltage of at least 18 V and/or at most 72 V.

6. The battery pack according to claim 5, wherein the first voltage is a rated voltage of at least 30 V, or wherein the second voltage is a rated voltage of at most 54 V.

7. A method of operating a battery pack with at least one of a first electrically driven work device and/or a first charging device with a first voltage or a second electrically driven work device and/or a second charging device with a second voltage, which comprises utilizing the battery pack of claim 1 with said at least one of the first electrically driven work device and/or the first charging device with the first voltage or the second electrically driven work device and/or the second charging device with the second voltage.

8. A system, comprising:

at least one of: a first electrically driven work device, a first charging device, a second electrically driven work device, or a second charging device; and a battery pack comprising:

a plurality of battery cells; and at least three pack power contacts, wherein a first pack pair of the pack power contacts is designed for making contact with device power contacts of the first electrically driven work device and/or the first charging device, wherein the battery pack is designed for supplying, due to contact being made, the first work device with electrical drive power with a first electrical voltage from at least a portion of the plurality of battery cells and/or supplying, due to contact being made, at least a same portion of the plurality of battery cells with electrical charging power with the first voltage from the first charging device by way of the first pack pair, and wherein a second pack pair of the pack power contacts, which second pack pair is different from the first pack pair at least in portions, is designed for making contact with device power contacts of the second electrically driven work device and/or the second charging device, wherein the battery pack is designed for supplying, due to contact being made, the second work device with electrical drive power with a second electrical voltage, which is higher than the first voltage, from at least a same portion of the plurality of battery cells and/or supplying, due to contact being made, at least a same portion of the plurality of battery cells with electrical charging power with the second voltage from the second charging device by way of the second pack pair, a power transmission device, wherein the plurality of battery cells has a first number of battery cells and a second number of battery cells, wherein the power transmission device is designed for transmitting electrical charging and/or drive power from the first pack pair and/or the first number of battery cells to the second number of battery cells and/or from the second number of battery cells to the first pack pair and/or the first number of battery cells for adjusting a first state of charge of the first number of battery cells and a second state of charge of the second number of battery cells, wherein the power transmission device has at least three inputs and/or outputs, wherein a first transmission pair of the inputs and/or outputs and the first number of battery cells and the first pack pair are permanently interconnected electrically in parallel and not the second number of battery cells, wherein a second transmission pair of the inputs and/or outputs, which second transmission pair is different from the first transmission pair at least in portions, and the second number of battery cells are permanently interconnected electrically in parallel and not the first number of battery cells, and wherein a third transmission pair of the inputs and/or outputs, which third transmission pair is different from the first transmission pair and the second transmission pair at least in portions, and the first number of battery cells and the second number of battery cells permanently interconnected electrically in series and the second pack pair are permanently interconnected electrically in parallel, wherein the battery pack is designed for supplying the first voltage defined by a first total voltage only of the first number of battery cells, wherein the battery pack is designed for supplying the second voltage defined by a second total voltage of the first number of battery cells and the second number of battery cells permanently interconnected electrically in series, wherein at least one pack power contact of the first pack pair is configured to not make contact with the device power contacts of the second work device and/or the second charging device, wherein the battery pack is designed for supplying only the first voltage by way of the first pack pair, and wherein the battery pack is designed for supplying only the second voltage by way of only the second pack pair.

9. The system according to claim 8, wherein the first work device or the second work device is a saw, a pole pruner, a brush cutter, a set of hedge shears, a hedge cutter, a blower device, a leaf blower, a lopper, a separation grinder, a sweeping device, a sweeping roller, a sweeping brush, a lawnmower, a scarifier, a set of grass shears or a high-pressure cleaner.

* * * * *